US012088887B2

(12) United States Patent
Yang et al.

(10) Patent No.: US 12,088,887 B2
(45) Date of Patent: Sep. 10, 2024

(54) DISPLAY METHOD AND APPARATUS FOR ITEM INFORMATION, DEVICE, AND COMPUTER-READABLE STORAGE MEDIUM

(71) Applicant: Tencent Technology (Shenzhen) Company Limited, Shenzhen (CN)

(72) Inventors: Lin Yang, Shenzhen (CN); Chunyong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 61 days.

(21) Appl. No.: 17/722,186

(22) Filed: Apr. 15, 2022

(65) Prior Publication Data
US 2022/0239988 A1 Jul. 28, 2022

Related U.S. Application Data

(63) Continuation of application No. PCT/CN2021/092710, filed on May 10, 2021.

(30) Foreign Application Priority Data

May 27, 2020 (CN) .......................... 202010460986.6

(51) Int. Cl.
*H04N 21/478* (2011.01)
*G06V 20/50* (2022.01)
(Continued)

(52) U.S. Cl.
CPC ....... *H04N 21/47815* (2013.01); *G06V 20/50* (2022.01); *G06V 40/172* (2022.01); *H04N 21/2187* (2013.01); *H04N 21/4316* (2013.01)

(58) Field of Classification Search
None
See application file for complete search history.

(56) References Cited

U.S. PATENT DOCUMENTS 8,849,945 B1 * 9/2014 Desjardins ........... G11B 27/031
725/35
9,177,225 B1 * 11/2015 Cordova-Diba .......... G06T 7/12
(Continued)

FOREIGN PATENT DOCUMENTS

CN 104090762 A 10/2014
CN 105869007 A 8/2016
(Continued)

OTHER PUBLICATIONS

Tencent Technology, ISR, PCT/CN2021/092710, Aug. 10, 2021, 3 pgs.
(Continued)

*Primary Examiner* — An Son P Huynh
(74) *Attorney, Agent, or Firm* — Morgan, Lewis & Bockius LLP

(57) ABSTRACT

This application relates to a method for displaying item information performed by a computer device. The method includes: displaying a live stream image comprising a live stream host performing in a live stream environment and at least one item located in the live stream environment, and the at least one item comprising a target item; in response to an item recognition operation, displaying an item tag corresponding to the at least one item; and in response to receiving a first selection operation on an item tag, displaying an item link region. Because the item tag includes an item keyword, preliminary information corresponding to the item can be directly provided to a viewer of the live stream. When the viewer account initiates a selection operation on the item tag, an item link region including item information
(Continued)

is displayed. In this way, the viewer can further interact with the item information.

18 Claims, 9 Drawing Sheets

(51) Int. Cl.
*G06V 40/16* (2022.01)
*H04N 21/2187* (2011.01)
*H04N 21/431* (2011.01)

(56) References Cited

U.S. PATENT DOCUMENTS

| | | | |
|---|---|---|---|
| 9,436,876 B1* | 9/2016 | Carlson | G06F 18/2323 |
| 9,560,415 B2 | 1/2017 | Good et al. | |
| 9,652,659 B2* | 5/2017 | Kang | G06V 20/64 |
| 10,002,191 B2* | 6/2018 | Trollope | G06F 16/7834 |
| 11,500,533 B2* | 11/2022 | Yun | G06F 3/04845 |
| 2005/0180632 A1* | 8/2005 | Aradhye | G06V 20/63 382/182 |
| 2006/0031870 A1* | 2/2006 | Jarman | H04N 21/8456 |
| 2009/0202114 A1* | 8/2009 | Morin | A63F 13/12 382/118 |
| 2010/0154007 A1* | 6/2010 | Touboul | G06Q 30/02 725/115 |
| 2010/0217671 A1* | 8/2010 | Lee | H04N 21/235 707/E17.108 |
| 2010/0257156 A1* | 10/2010 | Hiroi | G11B 27/34 707/741 |
| 2011/0282906 A1* | 11/2011 | Wong | G06F 16/7837 707/E17.03 |
| 2013/0031582 A1* | 1/2013 | Tinsman | H04N 21/4316 725/36 |
| 2013/0036200 A1* | 2/2013 | Roberts | H04L 65/1093 709/219 |
| 2013/0036442 A1* | 2/2013 | Wingert | H04N 21/42209 725/60 |
| 2013/0275411 A1* | 10/2013 | Kim | G06F 16/532 707/722 |
| 2014/0068692 A1* | 3/2014 | Archibong | H04N 21/6334 725/116 |
| 2014/0168056 A1* | 6/2014 | Swaminathan | G06V 30/142 345/156 |
| 2014/0338001 A1* | 11/2014 | Zhang | G06F 21/6218 726/28 |
| 2015/0070516 A1* | 3/2015 | Shoemake | H04N 21/4542 348/207.11 |
| 2016/0163029 A1 | 6/2016 | Gibbon et al. | |
| 2016/0381427 A1* | 12/2016 | Taylor | H04N 21/472 725/13 |
| 2017/0366867 A1* | 12/2017 | Davies | H04N 21/8133 |
| 2018/0167648 A1* | 6/2018 | Lee | H04N 21/845 |
| 2018/0310066 A1* | 10/2018 | Kobayashi | H04N 21/4316 |
| 2018/0350144 A1* | 12/2018 | Rathod | G06Q 20/3224 |
| 2019/0080342 A1* | 3/2019 | Andon | G06Q 50/01 |
| 2019/0179405 A1* | 6/2019 | Sun | G06F 1/1686 |
| 2019/0191203 A1* | 6/2019 | Asbun | H04N 21/6587 |
| 2019/0289359 A1* | 9/2019 | Sekar | H04N 21/4333 |
| 2020/0092607 A1* | 3/2020 | Rechner | G06F 40/242 |
| 2020/0120097 A1* | 4/2020 | Amitay | G06F 16/9537 |
| 2020/0288019 A1* | 9/2020 | Taylor | H04L 51/58 |
| 2021/0081093 A1* | 3/2021 | Yun | G06F 3/04842 |
| 2022/0179665 A1* | 6/2022 | Rathod | G06F 9/451 |

FOREIGN PATENT DOCUMENTS

| | | |
|---|---|---|
| CN | 105916050 A | 8/2016 |
| CN | 106202317 A | 12/2016 |
| CN | 107633066 A | 1/2018 |
| CN | 108124184 A | 6/2018 |
| CN | 108229379 A | 6/2018 |
| CN | 108462889 A | 8/2018 |
| CN | 108596052 A | 9/2018 |
| CN | 109034115 A | 12/2018 |
| CN | 109168034 A | 1/2019 |
| CN | 109274999 A | 1/2019 |
| CN | 109766914 A | 5/2019 |
| CN | 109947988 A | 6/2019 |
| CN | 110213307 A | 9/2019 |
| CN | 110378773 A | 10/2019 |
| CN | 110505498 A | 11/2019 |
| CN | 110751539 A | 2/2020 |
| CN | 111652678 A | 9/2020 |

OTHER PUBLICATIONS

Tencent Technology, WO, PCT/CN2021/092710, Aug. 10, 2021, 5 pgs.
Tencent Technology, IPRP, PCT/CN2021/092710, Nov. 17, 2022, 6 pgs.

* cited by examiner

DISPLAY METHOD AND APPARATUS FOR ITEM INFORMATION, DEVICE, AND COMPUTER-READABLE STORAGE MEDIUM

CROSS-REFERENCE TO RELATED APPLICATIONS

This application is a continuation application of PCT Patent Application No. PCT/CN2021/092710, entitled "ARTICLE INFORMATION DISPLAY METHOD, APPARATUS AND DEVICE AND READABLE STORAGE MEDWM" filed on May 10, 2021, which claims priority to Chinese Patent Application No. 202010460986.6, filed with the State Intellectual Property Office of the People's Republic of China on May 27, 2020, and entitled "DISPLAY METHOD AND APPARATUS FOR ITEM INFORMATION, TERMINAL, SERVER, AND COMPUTER-READABLE STORAGE MEDIUM", all of which are incorporated herein by reference in their entirety.

FIELD OF THE TECHNOLOGY

This application relates to the field of computer technologies, and in particular, to a display method and apparatus for item information, a device, and a computer-readable storage medium.

BACKGROUND OF THE DISCLOSURE

An account of a live stream host in a live stream application is used to initiate a live stream, and the live stream host can recommend products in the live stream.

In related art, in the account of a live stream host, a link of a to-be-sold product can be added to a live stream viewer room before the live stream is started, and when the viewer wants to buy the product, a link in a live stream interface can be clicked to trigger a product purchase request. The live stream interface may further display an item in the environment where the live stream host is in. For example, products recommended by the live stream host are: a lipstick A and a skin care product B; and a room where the live stream host is in further includes items: a photo frame C hung on the wall, and a teddy bear D placed on the table.

However, in the foregoing implementation process, when needing to know other items displayed in the live stream viewer room, the viewer needs to query the live stream host or search in a shopping application by keywords, resulting in low efficiency of information interaction and poor user experience.

SUMMARY

Embodiments of this application provide a display method and apparatus for item information, a terminal, a server, and a computer-readable storage medium, which can improve the efficiency of information interaction in a live stream viewer room, thereby improving the user experience. The technical solutions are as follows:

According to one aspect, a method for displaying user-identified item information is performed by a computer device, the method including:

displaying a live stream image, the live stream image comprising a live stream host performing in a live stream environment and at least one item located in the live stream environment, and the at least one item comprising a target item;

in response to an item recognition operation, displaying an item tag corresponding to the at least one item on a display of the computer device, the item recognition operation being configured to perform recognition on the at least one item in the live stream image, a display position of the item tag corresponding to a display region of an item in the live stream image, and the item tag comprising an item keyword of the item; and in response to receiving a first selection operation on an item tag of the target item, displaying an item link region on the display of the computer device, the item link region comprising a product link corresponding to the target item.

According to another aspect, a computer device is provided, including one or more processors and one or more memories, the one or more memories storing at least one piece of program code, the program code being loaded and executed by the one or more processors and cause the computer device to implement the display method for item information.

According to another aspect, a non-transitory computer-readable storage medium is provided, the non-transitory computer-readable storage medium storing at least one piece of program code, the program code being loaded and executed by a processor of a computer device and causing the computer device to implement an operation performed in the display method for item information.

According to another aspect, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the foregoing display method for item information according to any one of the foregoing embodiments.

The technical solutions provided in the embodiments of this application produce at least the following beneficial effects:

By performing recognition on an item in a live stream image through an item recognition operation, an item tag is displayed in a display position corresponding to a display region of the item. Because the item tag includes an item keyword, preliminary information corresponding to the item can be directly provided to a viewer account. When the viewer account initiates a selection operation on the item tag, an item link region including item information is displayed. In this way, the viewer account can further interact with the item information and gain a multi-level understanding of other items displayed in a live stream viewer room, which improves the efficiency of information interaction in the live stream viewer room, thereby improving the user experience.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
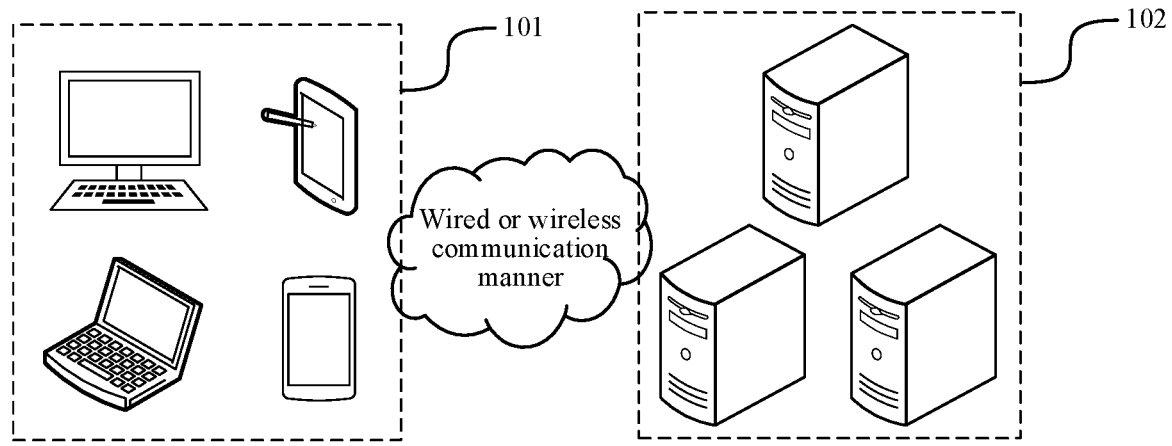
FIG. 1 is a schematic diagram of an implementation environment of a display method for item information according to an embodiment of this application.

To make the objectives, technical solutions, and advantages of this application clearer, the following further describes implementations of this application in detail with reference to the accompanying drawings.

First, terms involved in the embodiments of this application are briefly introduced.

Live stream: refers to collecting data of a live stream host through a device and converting the data into a video stream that can be transmitted after a series of processing, for example, a technology of encoding and compressing a video, converting the video into a video stream, and outputting the video stream to a viewing terminal for playback. The display method for item information provided in the embodiments of this application can be applied to a live stream application, and can also be applied to a live stream function in other applications. For example, using the display method for item information applied to the live stream function in a shopping application as an example, after registering an account in the shopping application, the user can initiate a live stream viewer room with himself as a live stream host in a live stream function section. An initiation of the live stream viewer room includes or does not include conditional restrictions. In some embodiments, the user can open a live stream viewer room by applying for qualifications for live stream. In other embodiments, the user directly selects to start the live stream in a user interface of the live stream function, and after live stream viewer room information is filled in, a live stream viewer room can be opened for live stream. In some embodiments, the user account can further be used as a viewer account to watch a live stream video of a live stream host account.

In this embodiment, because the live stream viewer room is implemented as a live stream viewer room opened in a live stream function section provided in the shopping application, the live stream viewer room is provided with a product link added by the live stream host to guide the viewer to purchase products. After being able to select the product link, the viewer enters a product purchase interface to purchase products. In this embodiment of this application, in addition to the product link added by the live stream host, the viewer can further perform recognition on other items displayed on a live stream image through an item recognition operation, so as to interact with other items displayed on the live stream image except an item recommended by the live stream host.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a speech processing technology, a natural language processing technology, and machine learning/deep learning (DL).

Machine learning (ML) is a multi-disciplinary subject involving a plurality of disciplines such as probability theory, statistics, approximation theory, convex analysis, and algorithm complexity theory. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations.

The CV technology is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, the CV studies related theories and technologies and attempts to establish an AI system that can obtain information from images or multidimensional data. The CV technologies usually include technologies such as image processing, image recognition, image semantic understanding, image retrieval, optical character recognition(OCR), video processing, video semantic understanding, video content/behavior recognition, three-dimensional object reconstruction, a three-dimensional (3D) technology, virtual reality, augmented reality, synchronous positioning, or map construction, and further include biological feature recognition technologies such as common face recognition and fingerprint recognition.

The so-called AI cloud service is also generally referred to as artificial intelligence as a service (AIaaS). This is a current mainstream service manner of an AI platform. Specifically, an AIaaS platform splits several common AI services and provides independent or packaged services in the cloud. The service model is similar to opening an AI-themed mall: all developers can access one or more AI services provided by a platform through an application programming interface (API). Some experienced developers can further deploy and operate their own cloud AI services by using an AI framework and AI infrastructure provided by the platform.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application relate to image processing of an AI service, for example, technologies such as image processing of an AI cloud service, which are specifically described by the following embodiments:

FIG. 1 is a schematic diagram of an implementation environment of a display method for item information according to an embodiment of this application. Referring to FIG. 1, the implementation environment includes a terminal 101 and a server 102.

The terminal 101 may be a smartphone, a tablet computer, a notebook computer, a desktop computer, a smart speaker, a smart watch, or the like, but is not limited thereto. An application including a live stream function can be installed and run on the terminal 101, and the terminal 101 can display the live stream interface, so that the user can watch a live stream through the terminal 101. The user can trigger a live stream viewing button on a visual interface of the terminal 101, and the terminal can generate live stream data obtaining instruction in response to the trigger operation to obtain the live stream data. The terminal 101 and the server 102 may be directly or indirectly connected in a wired or wireless communication manner, which is not limited in this application. The terminal 101 can transmit the live stream data obtaining instruction to the server 102, receive the live stream data returned by the server 102, then decode the received live stream data to obtain an audio frame and a video frame, and perform, based on the decoded audio frame and video frame, a live stream.

The terminal 101 may generally refer to one of a plurality of terminals. In this embodiment, the terminal 101 is used as an example for description. A person skilled in the art may learn that there may be more or fewer terminals. For example, there may be only one terminal, or there may be dozens of or hundreds of terminals or more. This embodiment of this application does not limit the quantity of terminals and device types.

The server 102 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The server 102 and the terminal 101 may be directly or indirectly connected in a wired or wireless communication manner, which is not limited in this application. The server 102 can receive a live stream data obtaining request transmitted by each terminal, and encode the audio frame and video frame uploaded by a live stream host terminal to obtain live stream data, and then distribute the live stream data to each terminal, so that each terminal performs, based on the received live stream data, the live stream. In some embodiments, the quantity of the foregoing servers may be more or less, which is not limited in this embodiment of this application. Certainly, the server 102 may further include other functional servers to provide more comprehensive and diversified services.

Figure 2:
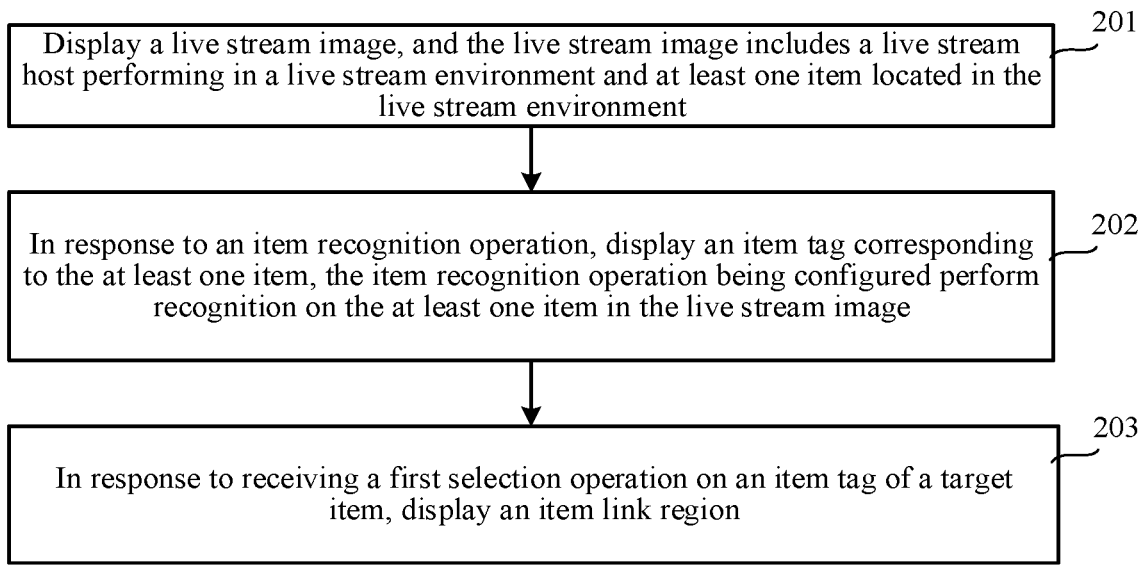
FIG. 2 is a flowchart of a display method for item information according to an embodiment of this application.

FIG. 2 is a flowchart of a display method for item information according to an embodiment of this application. Referring to FIG. 2, using the method being performed by a terminal as an example, the method includes the following steps:

Step 201. Display a live stream image, and the live stream image includes a live stream host performing in a live stream environment and at least one item located in the live stream environment, and the at least one item comprising a target item.

The live stream image is an image of a live stream video stream outputted by a live stream host account during a live stream.

In some embodiments, on a live stream host account side, after logging in to the live stream host account on the terminal and opening a live stream viewer room, the live stream host collects a live stream video stream through a camera, and transmits the live stream video stream to the terminal on a viewer account side through the server for playback. The live stream image is a frame or a group of video frames in the live stream video stream. The live stream image is a key frame in the live stream video stream; or, the live stream image is a video frame group in the live stream video stream, in which the $k^{th}$ key frame is used as a start frame, and the last non-key frame before the $k+1^{th}$ frame key frame is used as an end frame, k being a positive integer.

In some embodiments, the live stream image includes an item that the live stream host needs to recommend when recommending items, and the live stream image further includes other items that are captured by the camera.

For example, when the live stream host recommends clothes, the live stream image includes the clothes recommended by the live stream host, and the live stream image further includes hangers that carry the clothes, accessories worn by a model, decorations in a room, etc.; and when the live stream host recommends cosmetics, the live stream image includes the cosmetics recommended by the live stream host, and the live stream image further includes a rack that carries the cosmetics, skin care products on the rack, accessories used to match the cosmetics, etc.

In some embodiments, the live stream image is displayed in the live stream interface, and display elements such as live stream viewer room information, comment information, and a product link control are superimposed and displayed on the live stream image.

Figure 3:
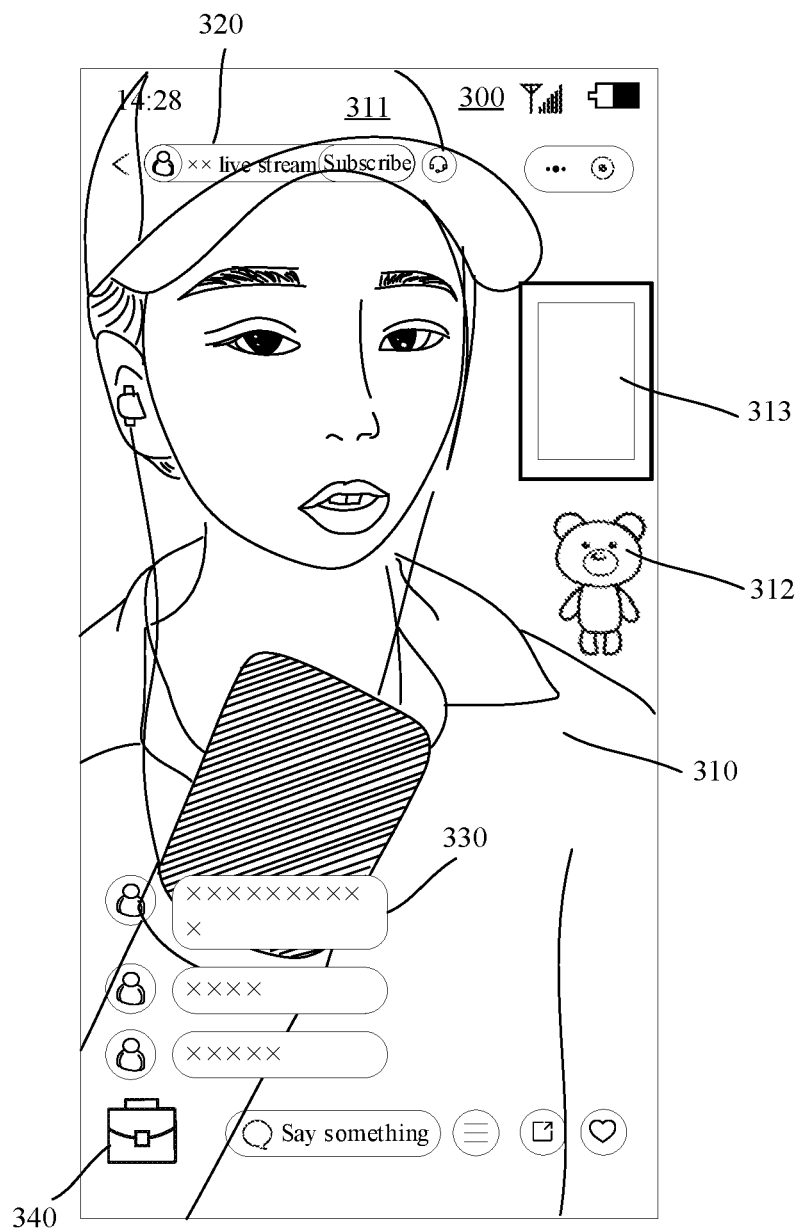
FIG. 3 is a schematic diagram of a live stream interface according to the embodiment shown in FIG. 2.

For example, FIG. 3 is a schematic diagram of a live stream interface according to an exemplary embodiment of this application. As shown in FIG. 3, a live stream interface 300 includes a live stream host 310 who is performing a live stream, where the live stream host 310 wears a hat 311, and the live stream image further includes a bear decoration 312 and a photo frame apparatus 313 in a live stream environment. The live stream interface 300 further includes live stream viewer room information 320, comment information 330, and a product link control 340. The live stream viewer room information 320 includes a name of the live stream viewer room, a name of the live stream, etc., the comment information 330 includes public comment content published by a viewer account for the live stream viewer room, and the product link control 340 is used for triggering to display a product link for recommended items set by the live stream host account.

At least one item includes a target item, and the target item is configured to refer to one or more of the at least one item.

Step 202. In response to an item recognition operation, display an item tag corresponding to at least one item.

The item recognition operation is configured to perform recognition on the at least one item in the live stream image.

In some embodiments, a receiving manner of the item recognition operation includes at least one of the following manners:

First, the live stream interface includes an item recognition control, and a trigger operation on the item recognition control is received as the item recognition operation.

In some embodiments, the item recognition control is a control directly displayed in the live stream interface; or, a function control is displayed in the live stream interface. After the function control is triggered, at least two controls included in the function control are expanded, including an item recognition control.

Figure 4:
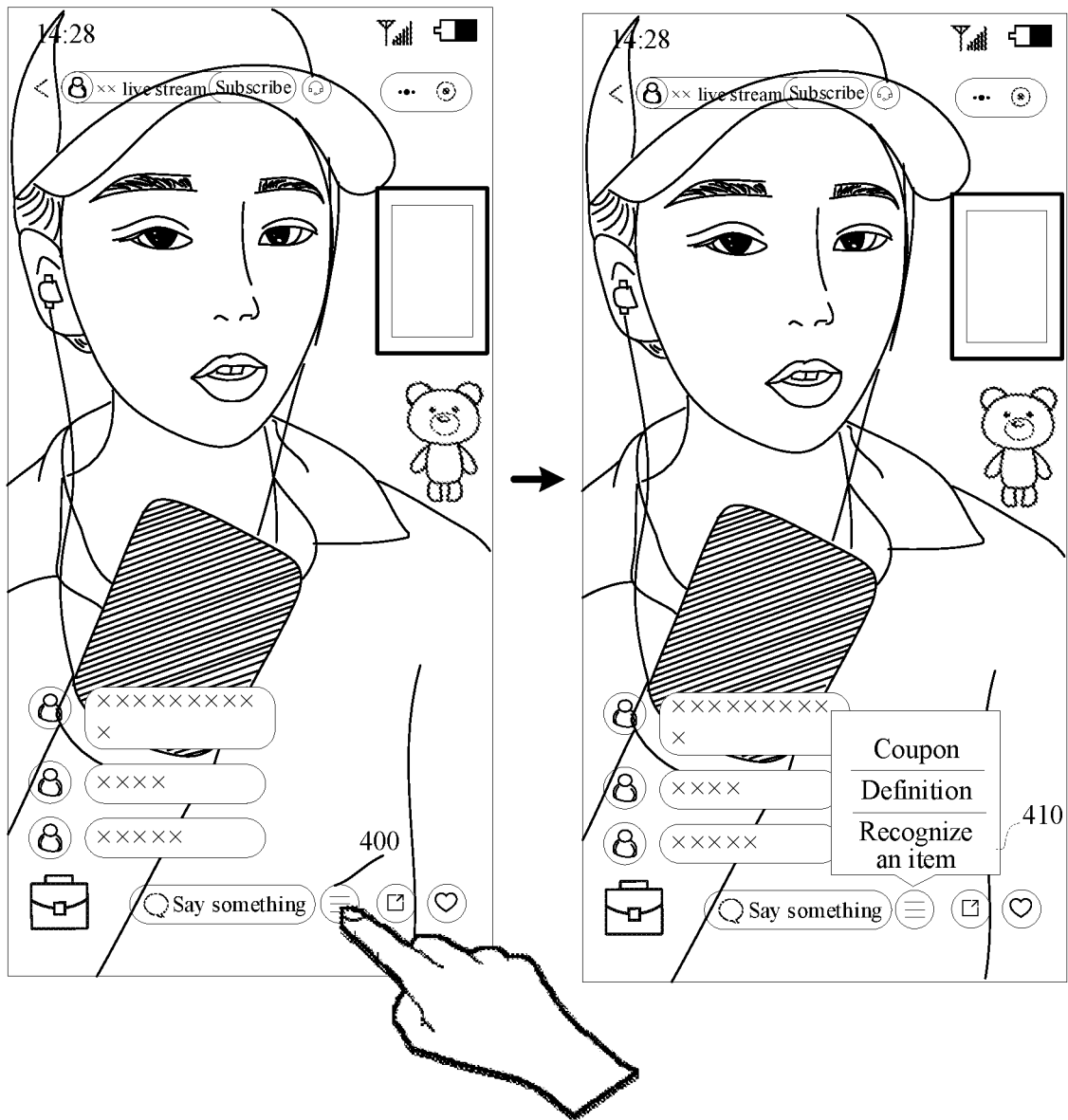
FIG. 4 is a schematic interface diagram of a display interface of an item recognition control according to the embodiment shown in FIG. 2.

For example, FIG. 4 is a schematic diagram of a display interface of an item recognition control according to an exemplary embodiment of this application. As shown in FIG. 4, a function control 400 is included in the live stream interface. When a trigger operation on the function control 400 is received, a control included in the function control 400 is expanded, including an item recognition control 410.

Second, the live stream interface includes a voice recognition control. After the voice recognition control is triggered, voice content is outputted, such as "recognize an item in the live stream image", and a voice input operation is used as an item recognition operation.

Third, any position in the live stream interface except for a control display element is clicked, and a click operation received at any position is used as an item recognition operation.

The foregoing receiving manner of the item recognition operation is only a schematic example, and this embodiment of this application does not limit the specific implementation of the item recognition operation.

In some embodiments, a process of recognizing an item on the live stream image can be completed by the server or by the terminal.

In a case that an item recognition process is completed by the server, when receiving the item recognition operation, the terminal records a timestamp of the live stream image in the live stream interface, and transmits the timestamp to the server, and the server obtains, based on the timestamp, the live stream image from cached live stream video data, and performs item recognition on the live stream image; or, when receiving the item recognition operation, the terminal directly obtains the live stream image, and transmits the live stream image to the server, and the server performs item recognition on the live stream image. That is, in response to the item recognition operation, the terminal transmits an item recognition request to the server. The item recognition request is configured to indicate to perform the item recognition on the live stream image, and tag display information returned by the server based on the item recognition request is received, where the tag display information is configured to indicate the display manner of the item tag corresponding to at least one item in the live stream image. The item tag on the live stream image is displayed based on the tag display information.

In a case that the item recognition process is completed by the terminal, the terminal first needs to obtain the live stream image when receiving the item recognition operation, so as to perform recognition on at least one item in the live stream image. When obtaining the live stream image, the terminal may take, based on the item recognition operation, a screenshot of a currently displayed live stream image. In some embodiments, the terminal caches, based on a playback time corresponding to each live stream image in a live stream process, a plurality of live stream images, then can respond to the item recognition operation, and obtains, based on a reception time of the item recognition operation, the live stream image corresponding to the playback time and the reception time of the item recognition operation from a buffer region. This embodiment of this application does not limit a specific manner of obtaining the live stream image. That is, in response to the item recognition operation, item recognition is performed on the live stream image to obtain the tag display information of the at least one item, and the item tag is displayed on the live stream image based on the tag display information.

A display position of the item tag corresponds to a display region of an item in the live stream image, and the item tag includes an item keyword of the item. When the live stream image includes at least two items, the display position of the item tag is in a one-to-one correspondence with the display region of the item. For example, the live stream image includes an item A, an item B, and an item C. The item A corresponds to a display region a on the live stream image, the item B corresponds to a display region b on the live stream image, and the item C corresponds to a display region c on the live stream image; and then the item tag of the item A corresponds to the display region a, the item tag of the item B corresponds to the display region b, and the item tag of the item C corresponds to the display region c.

In some embodiments, the item tag includes an identification point and tag content, where the identification point is located in the display region of the item, and the tag content is located at a specified position on the periphery of the identification point, for example, the tag content is located at a first specified position to the left of the identification point, or the tag content is located at a second specified position to the right of the identification point. In some embodiments, the tag content is located at the second specified position to the right of the identification point by default. When the specified position to the right of the identification point cannot fully display the tag content, the tag content is displayed at the first specified position to the left of the identification point.

The item keyword is configured to identify a category of the item, such as "skip rope", "headphones", or the like.

Figure 5:
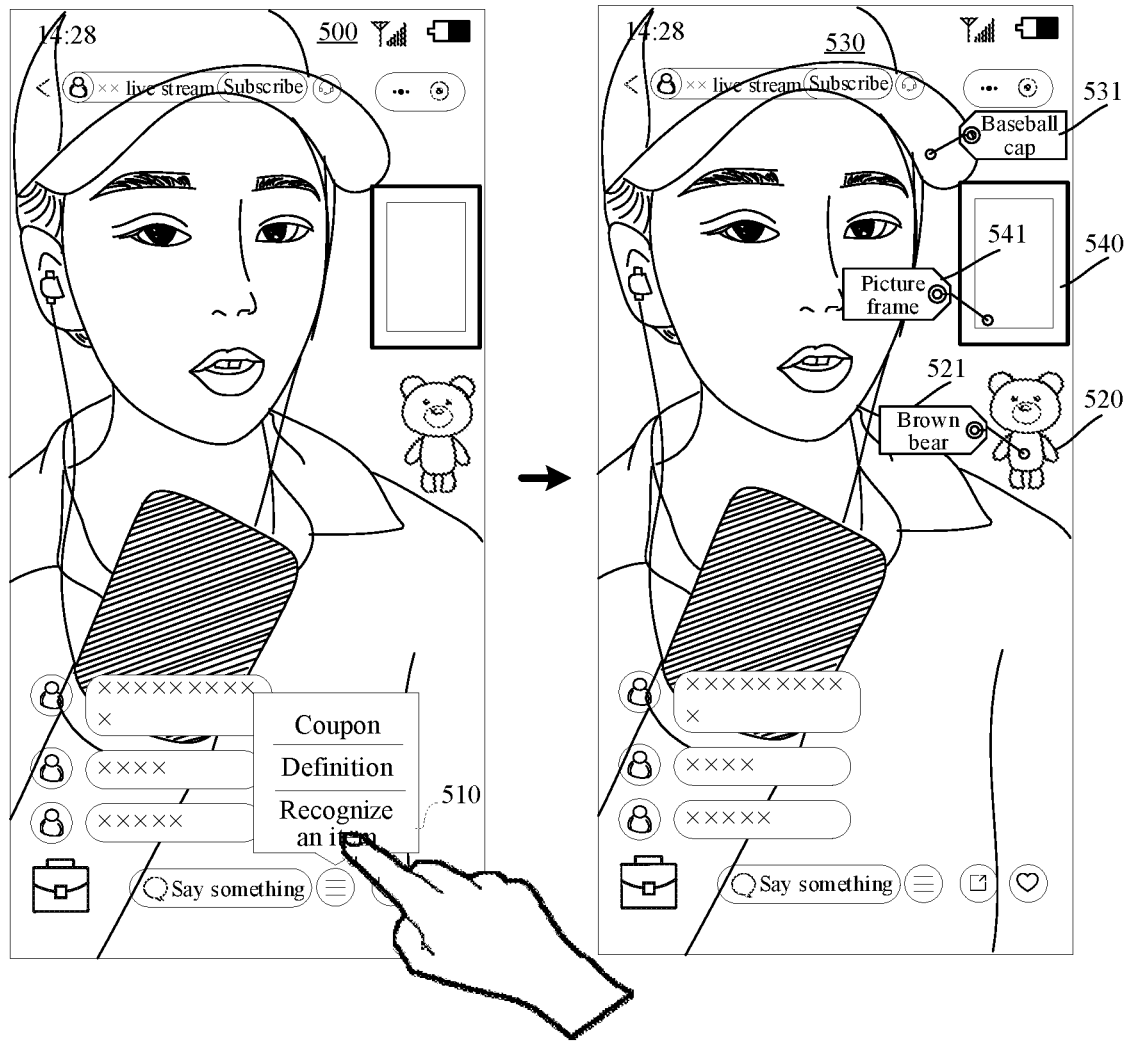
FIG. 5 is a schematic interface diagram of a display interface of an item tag according to the embodiment shown in FIG. 2.

For example, FIG. 5 is a schematic diagram of a display interface of an item tag according to an exemplary embodiment of this application. As shown in FIG. 5, a live stream interface 500 includes an item recognition control 510. When a trigger operation on the item recognition control 510 is received, the item tag is displayed in the live stream interface 500, including a tag 521 of an item 520 "brown bear", a tag 531 of an item 530 "baseball cap", and a tag 541 of an item 540 "picture frame".

Step 203. In response to receiving a first selection operation on an item tag of the target item, display an item link region.

The item link region includes a product link corresponding to the target item.

In response to receiving the first selection operation on the item tag of the target item, at least one product link corresponding to the target item is obtained, where the product link is a link to a product searched based on the item tag of the target item. The item link region is displayed, and at least one product option in the item link region is displayed, where each product option respectively corresponds to a product link.

In some embodiments, the product link corresponding to the target item uses the item keyword of the target item as a search keyword, and a search result is obtained by searching in a shopping search function. For example, after the search keyword "baseball cap" is searched in the shopping search function, the following results are obtained: a product 1-x brand baseball cap, a product 2-y brand baseball cap, and a product 3-z brand baseball cap. A product link of the x-brand baseball cap, a product link of the y-brand baseball cap, and a product link of the z-brand baseball cap are obtained, and product options corresponding to all product links are displayed in an item link region.

Figure 6:
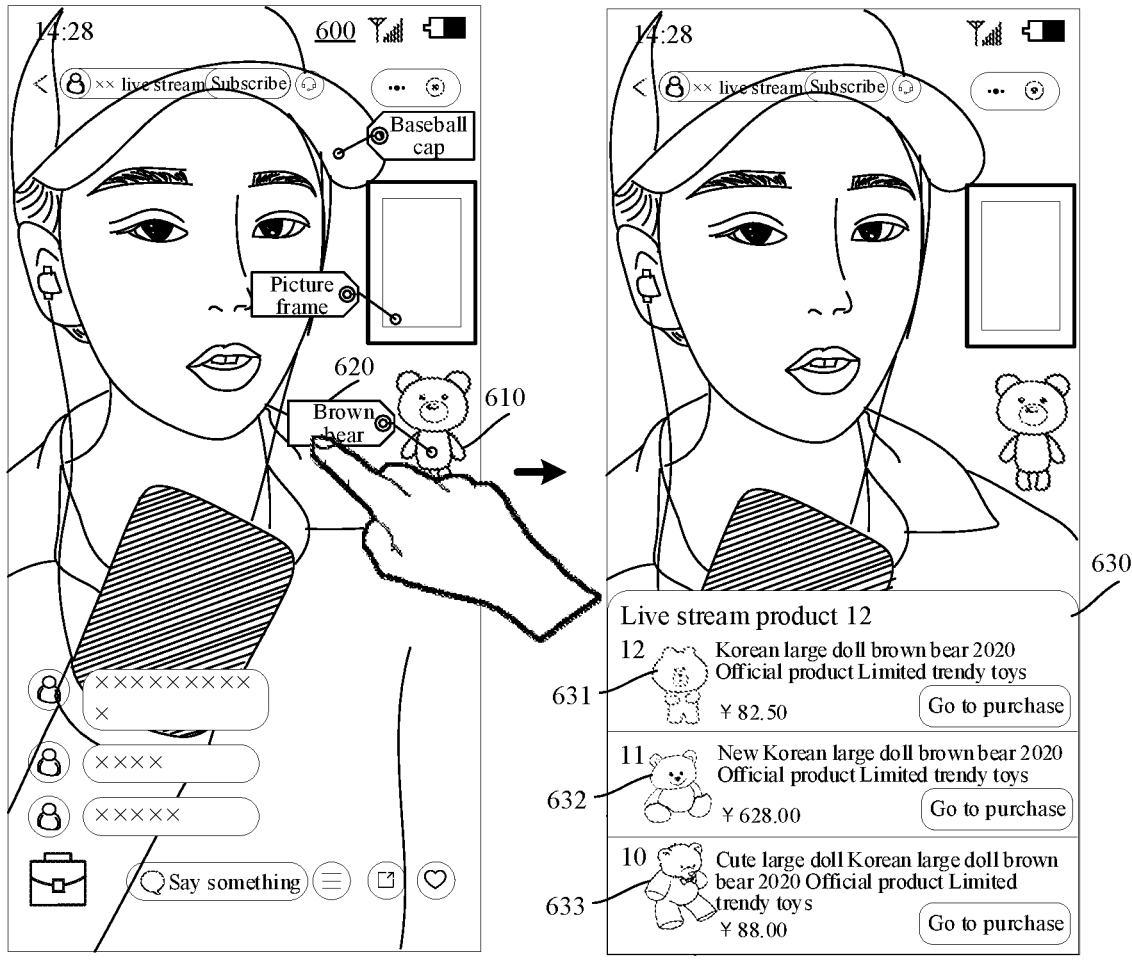
FIG. 6 is a schematic interface diagram of an item link region according to the embodiment shown in FIG. 2.

For example, FIG. 6 is a schematic interface diagram of an item link region according to an exemplary embodiment of this application. As shown in FIG. 6, an item tag 620 "brown bear" of a target item 610 is displayed in a live stream interface 600. When the first selection operation on the item tag 620 is received, an item link region 630 is displayed, where the item link region 630 includes a product option 631, a product option 632, and a product option 633.

During obtaining the product link, in response to receiving the first selection operation on the item tag of the target item, a target item keyword corresponding to the target item is transmitted to a server, and the product link fed back by the server based on the target item keyword is received.

In summary, in the display method for item information provided in the embodiments of this application, by performing recognition on an item in a live stream image through an item recognition operation, an item tag is displayed in a display position corresponding to a display region of the item. Because the item tag includes an item keyword, preliminary information corresponding to the item can be directly provided to a viewer account. When the viewer account initiates a selection operation on the item tag, an item link region including item information is displayed. In this way, the viewer account can further interact with the item information and gain a multi-level understanding of other items displayed in a live stream viewer room, which improves the efficiency of information interaction in the live stream viewer room, thereby improving the user experience.

Figure 7:
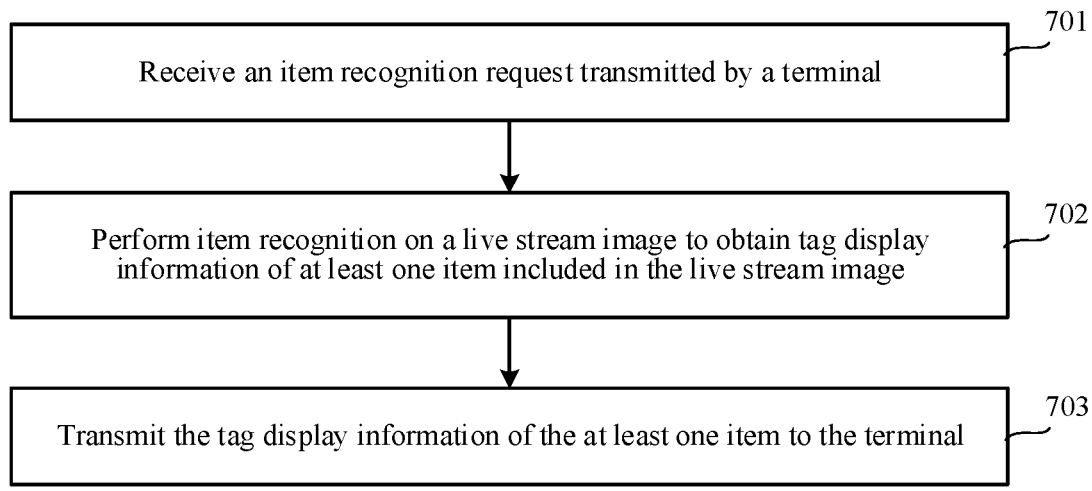
FIG. 7 is a flowchart of a display method for item information according to another exemplary embodiment of this application.

In some embodiments, descriptions are made in which the foregoing item tag recognized by the server is used as an example. FIG. 7 is a flowchart of a display method for item information according to another exemplary embodiment of this application. Using the method being performed by the server as an example, as shown in FIG. 7, the method includes:

Step 701. Receive an item recognition request transmitted by a terminal.

The item recognition request is a request transmitted by the terminal when a live stream image is displayed, and the item recognition request is configured to indicate to perform item recognition on the live stream image.

In some embodiments, when the terminal receives the item recognition operation, the live stream image displayed in the live stream interface in the terminal is used as an image for to-be-performed item recognition.

In some embodiments, the terminal carries a timestamp of the live stream image displayed in the live stream interface in the item recognition request and transmits the timestamp to the server. In this way, after obtaining the timestamp from the item recognition request, the server obtains the live stream image that needs to be recognized from cached live stream video data according to the timestamp.

Step 702: Perform item recognition on the live stream image to obtain tag display information of at least one item included in the live stream image.

The tag display information is configured to indicate a display manner of the item tag corresponding to the at least one item in the live stream image. In some embodiments, the tag display information is configured to indicate the display position of the item tag and the item keyword included in the item tag.

The server may perform recognition on the live stream image by using a pre-trained first image recognition model and second image recognition model. In some embodiments, other manners may further be used to perform recognition on the live stream image, which is not limited in this embodiment of this application.

In some embodiments, the live stream image is inputted into a first image recognition model, and item recognition is performed on the live stream image through the first image recognition model to obtain an item position of at least one item in the live stream image and a corresponding first item keyword; and based on the item position and the first item keyword, the tag display information is obtained.

In some embodiments, the first image recognition model is a convolutional neural network, and the convolutional neural network can perform, based on a strong correlation and strong similarity of adjacent pixels in the same image, recognition on the image. Because two adjacent pixels in an image are more related than two separate pixels in the image, performing recognition by using the convolutional neural network can improve the accuracy of a recognition result. In some embodiments, the first image recognition model may further be other types of network models, which are not limited in this embodiment of this application.

Using the first image recognition model as a convolutional neural network as an example, the first image recognition model includes a convolution layer, a convergence layer, and a classifier. In a possible implementation, the server may input the live stream image indicated by an item recognition request into the first image recognition model, through the convolution layer of the first image recognition model, divide the live stream image into a plurality of pixel blocks, express a height, a width, and a color of each pixel block with numbers to obtain a three-dimensional numerical expression of each pixel block, then sample the three-dimensional numerical expression of each pixel block through the aggregation layer in combination with a sampling function to obtain a joint array, which only includes a relatively important part of the live stream image, and further obtain the item position of at least one item in the live stream image and the corresponding first item keyword according to the joint array through the classifier of the first image recognition model.

When the live stream image is divided into a plurality of pixel blocks, the server may divide the live stream image into 3×3 or 5×5 pixel blocks. In some embodiments, the pixel block may further have other sizes, which are not limited in this embodiment of this application. In addition, in addition to expressing the height, width, and color of each pixel block to obtain the three-dimensional numerical expression of each pixel block, other contents of each pixel block can further be expressed to obtain a higher-dimensional numerical expression, such as a four-dimensional numerical expression, which is not limited in this embodiment of this application.

The first image recognition model can be pre-trained based on the following training process: the server may obtain a plurality of sample screen images and a sample item position of at least one sample item in each sample screen image and a corresponding first sample item keyword. The server may input, one by one, the plurality of sample screen images into an initial first image recognition model, divide the sample screen image into a plurality of sample pixel blocks through the convolution layer of the initial first image recognition model, express the height, width, and color of each sample pixel block with numbers to obtain the three-dimensional numerical expression of each sample pixel block, and then sample the three-dimensional numerical expression of each sample pixel block through the aggregation layer of the initial first image recognition model in combination with a sampling function to obtain a sample joint array to implement feature extraction and selection. The server further obtains the sample item position of at least one sample item in the sample screen image and the corresponding first sample item keyword according to the sample joint array through the classifier of the initial first image recognition model, and further determines a loss function value of the initial first image recognition model according to the sample item position of at least one sample item in the obtained sample screen image and the corresponding first sample item keyword and a result obtained by model processing. According to the loss function value, parameters of the initial first image recognition model are adjusted by a gradient descent method, and then a same processing is performed on the next sample screen image until the adjusted initial first image recognition model satisfies a preset condition, and then the initial first image recognition model that satisfies the preset condition is used as a trained first image recognition model.

The classifier can be a recognition rule, and the recognition rule is continuously adjusted through training to obtain a recognition rule with a higher recognition accuracy, and form relevant item keywords as a classifier of the first image recognition model, so as to obtain the item keyword of the item in the image through a classification decision. The preset condition may be that the accuracy of a prediction result satisfies an iteration cut-off condition, may further be that the loss function value satisfies the iteration cut-off condition, and may further be that the quantity of iterations reaches the preset quantity of times. This embodiment of this application does not limit the preset condition specifically adopted.

Before inputting the live stream image into the first image recognition model, the server may obtain scene information of a live stream viewer room, so as to determine, based on the obtained scene information, a scene keyword corresponding to the scene information, and may further delete the scene keyword from the at least one first item keyword after recognizing the at least one first item keyword. For example, if a scene in the live stream viewer room is an outdoor scene, the server can obtain the outdoor scene information, and determine items that may exist in the outdoor scene based on the outdoor scene information, such as a tree, a flower, etc., and may further delete the scene keywords existing in the outdoor scene such as a tree and a flower from the at least one first item keyword after recognizing the at least one first item keyword. By deleting the scene keyword from the recognized at least one keyword, the impact of a scene item on a subsequent processing process can be avoided, and the accuracy of the determined item information can be improved.

When obtaining scene information, the server may transmit a scene information obtaining request to the terminal. After receiving the scene information obtaining request, the terminal can obtain information such as light information, sound information or the like in the scene through a sensor, and convert the obtained light information or sound information into electrical information, so that the terminal and the server can recognize the information, and then transmit the scene information in the form of the electrical information to the server. In some embodiments, other manners may further be used to obtain the scene information, which is not limited in this embodiment of this application.

Before inputting the live stream image into the first image recognition model, the server further performs preprocessing on the live stream image. For example, the server may perform operations such as denoising, smoothing, and transformation on the live stream image. In some embodiments, other preprocessing manners may further be used, which are not limited in this embodiment of this application. By performing preprocessing on the live stream image, an important feature of the live stream image can be improved, the image quality of the live stream image can be improved, and the accuracy of a subsequent recognition result can further be improved.

In some embodiments, when tag display information is obtained according to the item position and the first item keyword, at least one item image is obtained from the live stream image according to the item position of at least one item in the live stream image; and the at least one item image and the corresponding first item keyword are inputted into the second image recognition model, and recognition is performed on the at least one item image by the second image recognition model to obtain the second item keyword corresponding to the at least one item image. Based on the first item keyword corresponding to the at least one item image and the second item keyword corresponding to the at least one item image, the item keyword of the at least one item in the live stream image is determined, and the tag display information is obtained by combining the item keyword of the at least one item and the item position of the at least one item.

When determining, based on the first item keyword and the second item keyword, the item keyword, the server may determine, among at least one second item keyword, a target second item keyword whose similarity with at least one first item keyword satisfies a preset condition, and use the target second item keyword as the item keyword of at least one item in the live stream image.

In some embodiments, the second image recognition model is a convolutional neural network, or other types of network models, which are not limited in this embodiment of this application.

Using the second image recognition model as a convolutional neural network as an example, the second image recognition model may include a convolution layer, a convergence layer, and a classifier. In a possible implementation, the server may input, pair by pair, the at least one item image and the corresponding first item keyword into the second image recognition model, through the convolution layer of the second image recognition model, divide the input item image into a plurality of pixel blocks, express a height, a width, and a color of each pixel block with numbers to obtain a three-dimensional numerical expression of each pixel block, then sample the three-dimensional numerical expression of each pixel block through the aggregation layer of the second image recognition model in combination with a sampling function to obtain a joint array, which only includes a relatively important part of the item image to implement feature extraction and selection, further obtain the second item keyword corresponding to the at least one item image according to the joint array through the classifier of the second image recognition model, and determine, based on the first item keyword corresponding to the at least one item image and the second item keyword corresponding to the at least one item image, the item keyword of at least one item in the live stream image.

The second image recognition model can be obtained by pre-training, and a training process is the same as the training process of the first image recognition model, which is not repeated herein.

Before inputting the at least one item image into the first second recognition model, the server further performs pre-processing on at least one item image. For example, the server may perform operations such as denoising, smoothing, and transformation on the at least one item image. In some embodiments, other preprocessing manners may further be used, which are not limited in this embodiment of this application. By performing preprocessing on the at least one item image, an important feature of the at least one item image can be improved, the image quality of the at least one item image can be improved, and the accuracy of a subsequent recognition result can further be improved.

Through the foregoing steps, item recognition can be performed on the live stream image of the live stream interface, and at least one item keyword in the live stream image can be obtained. For example, if a skipping rope is placed in the live stream viewer room, through the foregoing steps, the server can recognize that the live stream image includes the skipping rope to further obtain the corresponding item keywords, such as an "electronic skipping rope", a "skipping rope", etc.; and if headphones are placed in the live stream viewer room, through the foregoing steps, the server can recognize that the live stream image includes the headphones to further obtain corresponding item keywords, such as "wireless headphones", "Bluetooth headphones", or the like.

Step 703. Transmit the tag display information of the at least one item to the terminal.

The terminal is configured to display an item tag at a display position corresponding to a display region of at least one item according to the tag display information, where the item tag includes the item keyword.

In some embodiments, after displaying the item tag, the terminal may further trigger the obtaining of the item link through the first selection operation on the item tag. That is, after transmitting the tag display information of at least one item to the terminal, the server can further receive an item link obtaining request transmitted by the terminal. The item link obtaining request carries a target item keyword corresponding to the target item, at least one product link is obtained based on the target item keyword, and the at least one product link is transmitted to the terminal. Therefore, the terminal can display a product option corresponding to at least one product link.

In summary, in the display method for item information provided in the embodiments of this application, by performing recognition on an item in a live stream image through an item recognition operation, an item tag is displayed in a display position corresponding to a display region of the item. Because the item tag includes an item keyword, preliminary information corresponding to the item can be directly provided to a viewer account. When the viewer account initiates a selection operation on the item tag, an item link region including item information is displayed. In this way, the viewer account can further interact with the item information and gain a multi-level understanding of other items displayed in a live stream viewer room, which improves the efficiency of information interaction in the live stream viewer room, thereby improving the user experience.

Figure 8:
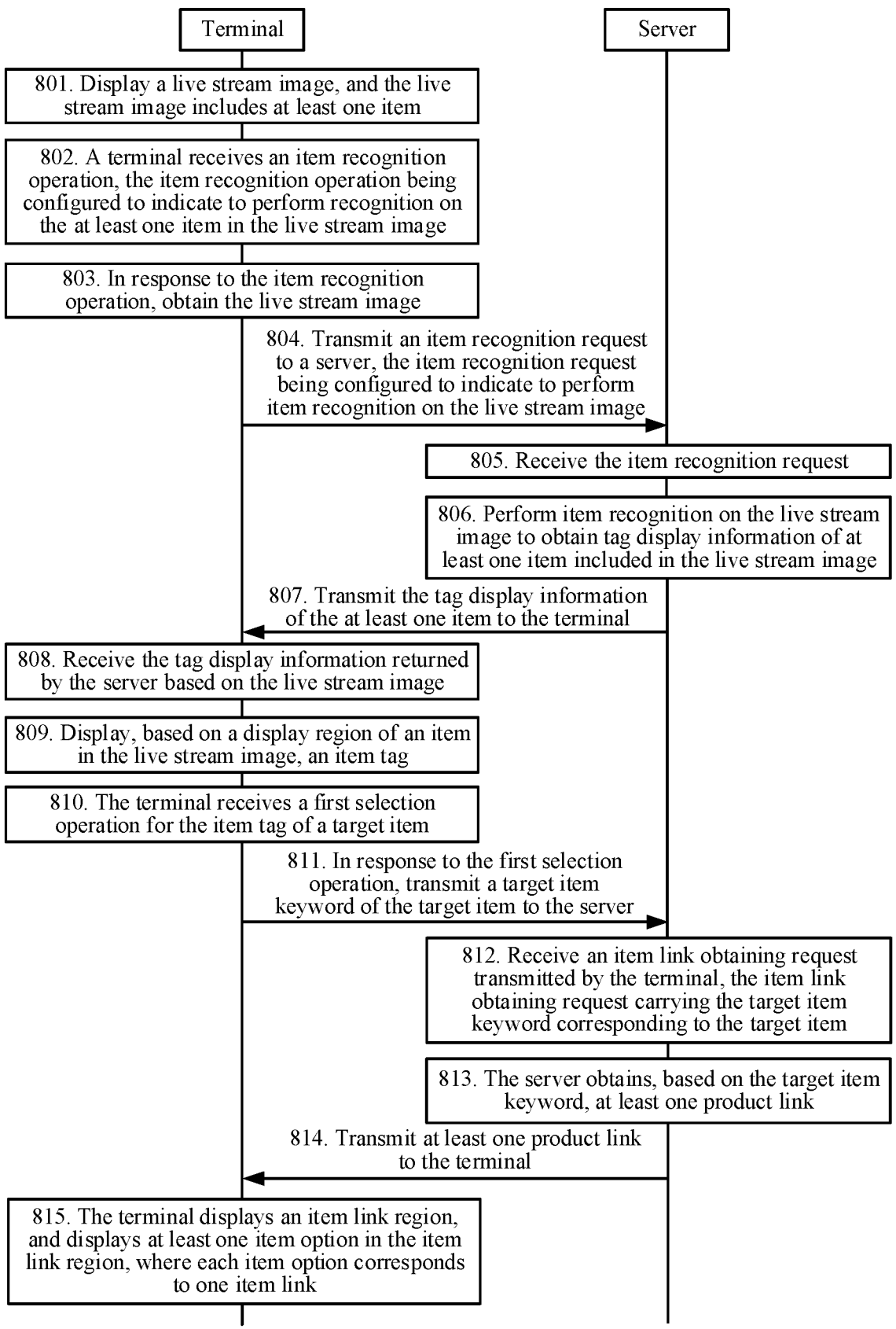
FIG. 8 is a flowchart of a display method for item information according to another exemplary embodiment of this application.

In some embodiments, the display method for item information provided in this application is implemented by an interaction between the terminal and the server. FIG. 8 is a flowchart of a display method for item information according to another exemplary embodiment of this application. Using the method applied to the interaction between the terminal and the server as an example, as shown in FIG. 8, the method includes:

Step 801. The terminal displays a live stream image, and the live stream image includes a live stream host performing in a live stream environment and at least one item located in the live stream environment, and the at least one item comprising a target item.

A live stream application or an application with a live stream function can be installed and run on the terminal, and the user can watch a live stream through this type of application.

At least one item includes a target item, and the target item is configured to refer to one of the at least one item.

Step 802. A terminal receives an item recognition operation, the item recognition operation being configured to perform recognition on the at least one item in the live stream image.

In some embodiments, the live stream interface includes an item recognition control, and when a trigger operation on the item recognition control is received, it is determined that the terminal receives the item recognition operation.

Step 803. In response to the item recognition operation, the terminal obtains the live stream image.

In a possible implementation, in response to the item recognition operation, based on a reception time of the item recognition operation, a live stream image corresponding to a playback time and the reception time of the item recognition operation is obtained from a buffer region, that is, a live stream image corresponding to the item recognition operation. The live stream image further corresponds to a timestamp, and the timestamp is configured to uniquely indicate the live stream image in the live stream video.

Step 804. The terminal transmits an item recognition request to the server, the item recognition request being configured to indicate to perform item recognition on the live stream image.

In some embodiments, the item recognition request carries the timestamp corresponding to the live stream image that needs to be recognized, so that the server can obtain, based on the timestamp, the live stream image from cached live stream video data.

The item recognition request further carries a user ID of the viewer account, and the server stores the user ID and the corresponding live stream image, so that when the live stream image needs to be obtained later, the live stream image can be directly obtained based on the user ID.

Step 805. The server receives the item recognition request.

Step 806: The server performs item recognition on the live stream image to obtain tag display information of at least one item included in the live stream image.

The tag display information is configured to indicate a display manner of the item tag corresponding to the at least one item in the live stream image. The tag display information includes a display position and an item keyword corresponding to the item tag of the at least one item. The display position is expressed by the display region of the item in the live stream image, that is, based on the display region of the item, the display position of the item tag on the live stream image is determined.

When the server performs item recognition on the live stream image to obtain at least one item keyword in the tag display information, the process can be roughly divided into the following steps: information obtaining, preprocessing, feature extraction and selection, classifier design, and classification decision-making.

The information obtaining refers to converting information such as light information or sound information into electrical information through a sensor. That is, basic information of a live stream viewer room scene is obtained and converted into information that a machine can recognize through a method of a convolutional neural network.

The preprocessing mainly refers to operations of denoising, smoothing, transformation, etc. in image processing, so as to improve an important feature of a product image in the live stream viewer room.

The feature extraction and selection refer to a need to extract and select features in pattern recognition.

The classifier design refers to obtaining a recognition rule through training, and through the recognition rule a feature classification can be obtained, so that an image recognition technology can obtain the high recognition rate. In this way, relevant tags and categories are formed, and then a classification decision is made and product categories in the live stream viewer room are recognized.

A process of obtaining the tag display information is described in detail in the foregoing step 702, and is not repeated herein.

In some embodiments, after recognizing at least one tag display information through a model, the server obtains a live stream item in the live stream viewer room, deletes the tag display information corresponding to the live stream item from the at least one tag display information obtained through recognition, and obtains at least one item information in the live stream image. By deleting information of the live stream item from the recognized item information, the item recommended by the live stream host during the live stream can be avoided being affected, and information on other items in the live stream viewer room can further be known, improving the information interaction efficiency in the live stream viewer room, and then improving the user experience.

Step 807. The server transmits the tag display information of the at least one item to the terminal.

The terminal is configured to display, based on the tag display information, an item tag corresponding to at least one item.

Step 808. The terminal receives the tag display information returned by the server based on the live stream image.

Step 804 to step 808 are described by using an interaction between the terminal and the server, receiving, by the server, the live stream image transmitted by the terminal, performing recognition on the live stream image, and then transmitting the recognized at least one piece of tag display information to the terminal as an example. In other possible implementations, the terminal can further directly perform, based on the obtained live stream image, item recognition on the live stream image to obtain the tag display information of the at least one item.

Step 809. The terminal, based on a display region of an item in the live stream image, displays an item tag.

In a possible implementation, the terminal may determine positions of all items in the live stream image according to the received at least one piece of tag display information, and then display, based on the display position and item keyword indicated by the received at least one piece of tag display information, corresponding item tags at corresponding positions on the live stream interface.

A process of displaying the item tag at the corresponding position based on item keyword is as follows: the terminal stores various tag shapes, selects a tag shape from the various tag shapes, generates, based on the selected tag shape, an interactive item tag, and then displays the corresponding item keyword on the item tag.

Step 810. The terminal receives a first selection operation for the item tag of the target item.

In some embodiments, the terminal receives a click operation on the item tag of the target item as the first selection operation.

Step 811. In response to the first selection operation, the terminal transmits a target item keyword of the target item to the server.

The user can trigger the item tag displayed on the terminal to trigger a viewing instruction of the item tag of the target item in the at least one item tag. In response to the viewing instruction, the terminal may transmit an item link obtaining request carrying the item keyword to the server.

Step 812. The server receives the item link obtaining request transmitted by the terminal, the item link obtaining request carrying the target item keyword corresponding to the target item.

Step 813. The server obtains, based on the target item keyword, at least one product link.

The server maintains an item link database for storing various item names and at least one item link corresponding to each item name. In a possible implementation, the server may match, based on the item keyword carried in the received item link request, the item name stored in the database, and then obtain, based on the matched item name, at least one item link corresponding to the item name.

In some embodiments, the item link database maintained by the server can further be configured to store a plurality of item keywords and at least one item link corresponding to each item keyword. In a possible implementation, the server may query, based on the item keyword carried in the received item link request, in the item link database to obtain at least one item link corresponding to the item keyword.

Descriptions of the foregoing two implementations are made in which the obtaining of the item link according to the item keyword is used as an example. In some possible implementations, the server may further obtain, based on the item image, the item link, or jointly obtain, based on the item keyword and the item image, the item link. Specifically, the server may obtain the item image corresponding to the item keyword according to the item keyword carried in the received item link obtaining request, respectively obtain at least one first item link and at least one second item link according to the item keyword and the item image, determine at least one coincident item link of the at least one first item link and the at least one second item link, and as at least one item link corresponding to the item link obtaining request, transmit the at least one item link to the terminal. By respectively obtaining the item link according to the item keyword and the item image, and then selecting the coincident item link from the obtained two sets of item links as the item link corresponding to the item link obtaining request, it can be ensured that the item corresponding to the determined item link is closer to the item in the live stream image, and the accuracy of the determined item link can be improved.

The item link obtaining request may carry a user ID, and the server queries the stored item image according to the user ID, so as to obtain the item image corresponding to the user ID, and then can obtain the item image corresponding to the item keyword from the item image corresponding to the user ID. By carrying the user ID, it is convenient for the server to more directly obtain the corresponding item image, and the accuracy of the obtained item image is ensured.

Before transmitting the at least one item link to the terminal, the server may further sort the at least one item link in descending order of a recommendation index corresponding to the at least one item link, and obtain at least one item link that is ranked before the target position. The recommendation index may include at least one of a price recommendation index, a sales volume recommendation index, a favorable recommendation index, and a logistics recommendation index. By sorting the item links according to the recommendation index, an item with higher comprehensive evaluation can be recommended to the user, which can increase the possibility of the user to purchase, improve the user experience, and increase a flow of a live stream viewer room.

Step 814. The server transmits at least one product link to the terminal.

In the foregoing description, descriptions are made in which the server sorting the item links according to the recommendation index corresponding to at least one item link is used as an example. In some embodiments, a sorting process of the item links can also be performed by the terminal. That is, the terminal obtains resource exchange data corresponding to at least one product link, the resource exchange data is configured to indicate a historical transaction situation corresponding to the at least one product option, and based on the resource exchange data, the at least one product option is displayed in sequence in an item link region. The resource exchange data is transmitted by the server according to the data obtaining request of the terminal. For example, if the terminal needs to sort the product links according to a sales situation, the terminal transmits the sales data obtaining request to the server. After the server feeds back historical sales data corresponding to all product links to the terminal, the terminal sorts the product links according to the historical sales data.

Step 815. The terminal displays an item link region, and displays at least one product option in the item link region, where each product option corresponds to one product link.

After receiving the item link, the terminal can perform processing on the item link, extract attribute information of the item, and then display the attribute information of the item while displaying the item link, so that the user can directly obtain a brief introduction of the item according to the attribute information, and it is convenient for the user to understand the item in the live stream viewer room.

If an item link triggered by the user is an item tag corresponding to live stream item information, the terminal can directly pop up the item link of the live stream item from a shopping bag. In some embodiments, the terminal may further display the item link of the live stream item in the item link display region, which is not limited in this embodiment of this application.

When displaying the item link, the terminal can perform detection on a face region in the live stream image, so as to determine the face region in the live stream image, and display at least one item link corresponding to the target item tag in a region other than the face region in the live stream interface. That is, in response to receiving the first selection operation on the item tag of the target item, face recognition is performed on the live stream image to obtain the face region in the live stream image, and the item link region is superimposed and displayed in the region other than the face region in the live stream image. By displaying the item link in the region other than the face region, it is ensured that the user can normally watch a live stream and the user experience is improved.

In a possible embodiment, in response to receiving the first selection operation on the item tag of the target item, face recognition is performed on the live stream image; in response to the live stream image including a face region, the item link region is superimposed and displayed on the live stream image with a first transparency; and in response to the live stream image not including the face region, the item link region is superimposed and displayed on the live stream image with a second transparency, where the first transparency is higher than the second transparency.

In some embodiments, after the at least one product link is displayed in the item link region, the second selection operation on the target product option may further be received, and when the second selection operation on the target product option is received, based on the second selection operation, resource exchange information is displayed, where the resource exchange information is configured to indicate information when resources are exchanged for a product corresponding to the target product option. For example, the resource exchange information includes information such as a price of a product, an inventory of a product, and a schematic diagram of a product. In some embodiments, when the second selection operation on the target product option is received, the resource exchange information in the live stream interface is displayed, for example: the resource exchange information is superimposed and displayed on the live stream image; or, when the second selection operation on the target product option is received, the resource exchange information is displayed after jumping to the resource exchange interface. In some embodiments, when the resource exchange information is displayed after jumping to the resource exchange interface, a display of the live stream interface is closed, or the live stream interface is displayed in a resource exchange interface in the form of a small window.

Figure 9:
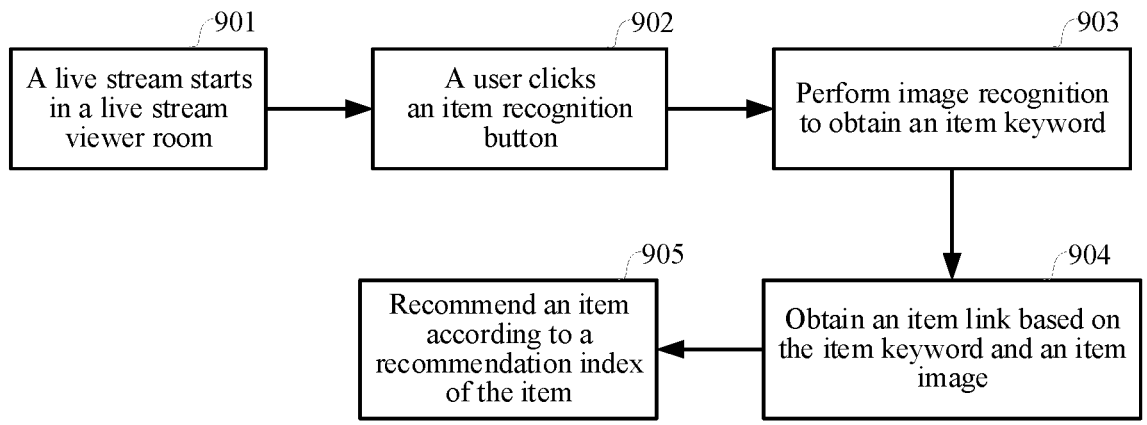
FIG. 9 is a flowchart of a display method for item information according to an embodiment of this application.

FIG. 9 is a flowchart of a display method for item information provided in an embodiment of this application. Referring to FIG. 9, after the live stream starts in the live stream viewer room in step 901, the live stream interface is displayed, and the user can click an item recognition button in step 902, and perform, based on a click operation of the item recognition button, step 903 to perform image recognition, and obtain an item keyword. Further, through step 904, an item link is obtained based on the item keyword and the item image. Step 905. Recommend an item according to a recommendation index of the item.

In the method provided in this embodiment of this application, after triggering the item recognition control, the user can obtain the live stream image of the live stream interface in real time, then the item in the live stream viewer room can be recognized in real time, and information of the item and a link to purchase the item or similar items are given. By obtaining the live stream image for item recognition, it can be ensured that after the live stream host takes out a new item, item information of the item can also be displayed to obtain the corresponding item tag, so that the user can also know the information of the item, and then obtain the item link, which ensures the real-time property of the item tag, improves the information interaction efficiency in the live stream viewer room, and improves the user experience.

In the solution provided in this embodiment of this application, by obtaining the tag display information of at least one item in the live stream image, and displaying, based on the item keyword of the at least one item, the item included in the live stream viewer room to the user at the corresponding position of the item in the live stream interface, the user can directly know the information of the item without querying the live stream host, which implements the expansion of a point-to-point data transmission manner in the live stream viewer room, improves the information interaction efficiency of the live stream viewer room, and further improves the user experience.

In the solution provided in this embodiment of this application, when the user triggers the item recognition control, based on AI intelligent image recognition and an intelligent recommendation technology, an item in an image can be autonomously recognized and classified items recommendation can be performed, so that some items in the live stream viewer room can be combined, and the user can know the item he sees, can freely choose to view the information of the item, and can further obtain the link of the item or similar items, which can increase the sense of experience of the user and psychological satisfaction.

In addition, after the user triggers the item recognition button, all the items in the live stream viewer room can be intelligently recognized with one click, thereby expanding the commercial value of the live stream viewer room. Through the recognized item keyword, a purchase channel of the item or similar items can be directly found, which can stimulate the user to purchase, and simultaneously lower a purchase threshold of the common user, being equivalent to invisibly recommending products and improving the efficiency of recommending products.

All the foregoing technical solutions may be arbitrarily combined to form an embodiment of this application, and details are not described herein again.

Figure 10:
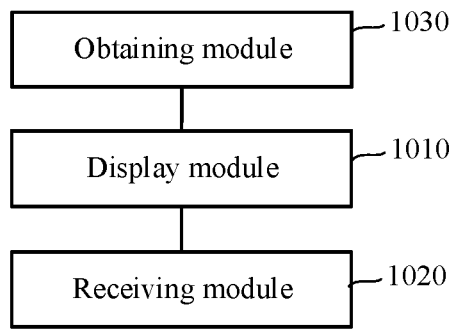
FIG. 10 is a structural diagram of a display apparatus for item information according to an embodiment of this application.

FIG. 10 is a structural diagram of a display apparatus for item information according to an embodiment of this application. Referring to FIG. 10, the apparatus includes:

- a display module 1010, being configured to display a live stream image, the live stream image including at least one item, and the at least one item including a target item;
- a receiving module 1020, being configured to receive an item recognition operation, the item recognition operation being configured to perform recognition on the at least one item in the live stream image; and
- the display module 1010, being further configured to display, in response to the item recognition operation, an item tag corresponding to the at least one item, a display position of the item tag corresponding to a display region of an item in the live stream image, and the item tag including an item keyword of the item;
- the receiving module 1020, being further configured to receive a first selection operation on an item tag of the target item; and
- the display module 1010, being further configured to display an item link region, the item link region including item information of the target item.

In an embodiment, the apparatus further includes:
- an obtaining module 1030, being configured to obtain, in response to receiving the first selection operation on the item tag of the target item, at least one product link corresponding to the target item, where the product link is a link to an item searched based on the item tag of the target item;
- a display module 1010, being further configured to display the item link region, and display at least one product option in the item link region, where each product option respectively corresponds to a product link.

In an embodiment, the at least one product option includes a target product option; and
- a receiving module 1020 is further configured to receive a second selection operation on the target product option; and
- a display module 1010 is further configured to display, based on the second selection operation resource, exchange information, where the resource exchange information is configured to indicate information when resources are exchanged for a product corresponding to the target product option.

In an embodiment, an obtaining module 1030 is further configured to transmit, in response to receiving the first selection operation on the item tag of the target item, a target item keyword corresponding to the target item to a server; and receive the product link fed back by the server based on the target item keyword.

In an embodiment, an obtaining module 1030 is further configured to obtain resource exchange data corresponding to the at least one product link, where the resource exchange data is configured to indicate a historical transaction situation corresponding to the at least one product option; and
- a display module 1010 is further configured to sequentially display, based on the resource exchange data, the at least one product option in the item link region.

In an embodiment, the apparatus further includes:
- an obtaining module 1030, being configured to transmit, in response to the item recognition operation, an item recognition request to the server, where the item recognition request is configured to indicate to perform item recognition on the live stream image; receive tag display information returned by the server based on the live stream image, where the tag display information is configured to indicate a display manner of the item tag corresponding to the at least one item in the live stream image; and
- a display module 1010, being further configured to display, based on the tag display information, the item tag in the live stream image.

In an embodiment, a display module 1010 is further configured to perform, in response to the item recognition operation, item recognition on the live stream image to obtain tag display information of the at least one item; and display, based on the tag display information, the item tag in the live stream image.

In an embodiment, a display module 1010 is further configured to perform, in response to receiving the first selection operation on the item tag of the target item, face recognition on the live stream image to obtain a face region in the live stream image; and superimpose and display the item link region in a region outside the face region in the live stream image.

In an embodiment, a display module 1010 is further configured to perform, in response to receiving the first selection operation on the item tag of the target item, face recognition on the live stream image;

the display module 1010 is further configured to superimpose and display, in response to the live stream image including a face region, the item link region on the live stream image with a first transparency; and in response to the live stream image not including the face region, superimpose and display the item link region on the live stream image with a second transparency, where the first transparency is higher than the second transparency.

Figure 11:
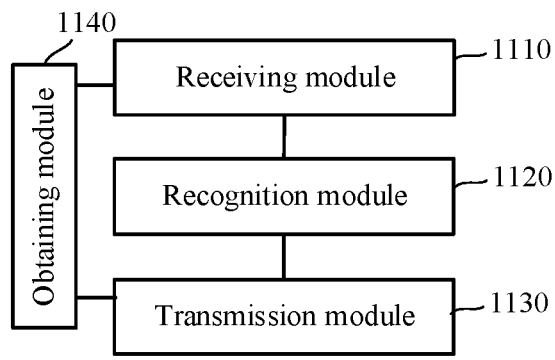
FIG. 11 is a structural diagram of a display apparatus for item information according to an embodiment of this application.

FIG. 11 is a structural block diagram of a display apparatus for item information according to another exemplary embodiment of this application. As shown in FIG. 11, the apparatus includes:

a receiving module 1110, being configured to receive an item recognition request transmitted by a terminal, the item recognition request being a request transmitted by the terminal when a live stream image is displayed, and the item recognition request being configured to indicate to perform item recognition on the live stream image;

a recognition module 1120, being configured to perform the item recognition on the live stream image to obtain tag display information of at least one item included in the live stream image, the tag display information being configured to indicate a display manner of the item tag corresponding to the at least one item in the live stream image; and a transmission module 1130, being configured to transmit the tag display information of the at least one item to the terminal.

In an embodiment, a receiving module 1110 is configured to receive an item link obtaining request transmitted by the terminal, where the item link obtaining request carries a target item keyword corresponding to a target item; and the apparatus further includes: an obtaining module 1140, being configured to obtain, based on the target item keyword, at least one product link; and a transmission module 1130, being configured to transmit the at least one product link to the terminal.

In an embodiment, a recognition module 1120 is further configured to input the live stream image into a first image recognition module; perform the item recognition on the live stream image by using the first image recognition model to obtain an item position of at least one item in the live stream image and a corresponding first item keyword; and obtain, based on the item position and the first item keyword, the tag display information.

In an embodiment, a recognition module 1120 is further configured to obtain at least one item image from the live stream image according to the item position of the at least one item in the live stream image;

a recognition module 1120 is further configured to input the at least one item image and the corresponding first item keyword into a second image recognition model, and perform recognition on the at least one item image by using the second image recognition model to obtain a second item keyword corresponding to the at least one item image; determine, based on the first item keyword corresponding to the at least one item image and the second item keyword corresponding to the at least one item image, an item keyword of the at least one item in the live stream image; and obtain the tag display information by combining the item keyword of the at least one item and the item position of the at least one item.

In summary, in the display apparatus for item information provided in the embodiments of this application, by performing recognition on an item in a live stream image through an item recognition operation, an item tag is displayed in a display position corresponding to a display region of the item. Because the item tag includes an item keyword, preliminary information corresponding to the item can be directly provided to a viewer account. When the viewer account initiates a selection operation on the item tag, an item link region including item information is displayed. In this way, the viewer account can further interact with the item information, gain a multi-level understanding of other items displayed in a live stream viewer room, improve the efficiency of information interaction in the live stream viewer room, and thus improve the user experience.

When the display apparatus for item information provided in the foregoing embodiments displays item information, the foregoing functional modules are only described for exemplary purposes. In actual applications, the functions may be allocated to different functional modules as required. That is, an internal structure of the terminal/server is divided into different functional modules to complete all or some of the functions described above. In addition, the display apparatus for item information and the display method for item information embodiments provided in the foregoing embodiments belong to one conception. For the specific implementation process, reference may be made to the method embodiments, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 12:
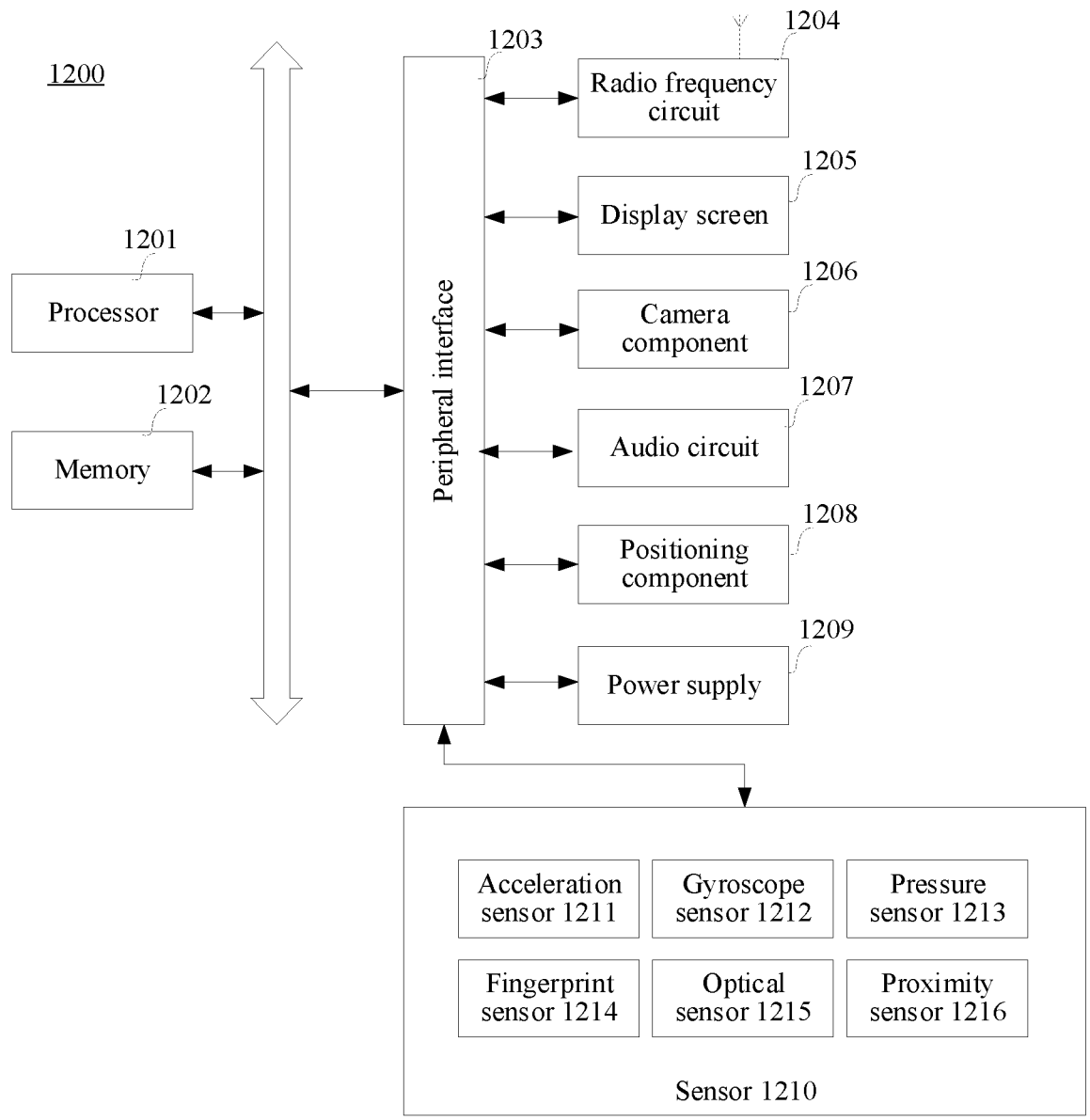
FIG. 12 is a schematic structural diagram of a terminal according to an embodiment of this application.

FIG. 12 is a schematic structural diagram of a terminal according to an embodiment of this application. The terminal 1200 may be a smartphone, a tablet computer, a moving picture experts group audio layer III (MP3) player, a moving picture experts group audio layer IV (MP4) player, a notebook computer, or a desktop computer. The terminal 1200 may also be referred to as other names such as user equipment, a portable terminal, a laptop terminal, or a desktop terminal.

Generally, the terminal 1200 includes one or more processors 1201 and one or more memories 1202.

The processor 1201 may include one or more processing cores. In some embodiments, the processor 1201 may further include an artificial intelligence (AI) processor. The AI processor is configured to process computing operations related to machine learning.

The memory 1202 may include one or more non-transitory computer-readable storage media that may be non-transitory. The memory 1202 may further include a high-speed random access memory and a non-volatile memory, such as one or more magnetic disk storage devices or flash storage devices. In some embodiments, a non-transitory computer-readable storage medium in the memory 1202 is configured to store at least one piece of program code, the at least one piece of program code being configured to be executed by the processor 1201 to implement the display method for item information provided in the method embodiments of this application.

In some embodiments, the terminal 1200 may include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral includes: at least one of a radio frequency (RF) circuit 1204, a display screen 1205, a camera component 1206, an audio frequency circuit 1207, a positioning component 1208, and a power source 1209.

In some embodiments, the terminal 1200 may further include one or more sensors 1210. The one or more sensors 1210 include, but are not limited to: an acceleration sensor 1211, a gyro sensor 1212, a pressure sensor 1213, a fingerprint sensor 1214, an optical sensor 1215, and a proximity sensor 1216.

A person skilled in the art may understand that the structure shown in FIG. 12 does not constitute a limitation to the terminal 1200, and the terminal may include more or fewer components than those shown in the figure, or some components may be combined, or a different component deployment may be used.

Figure 13:
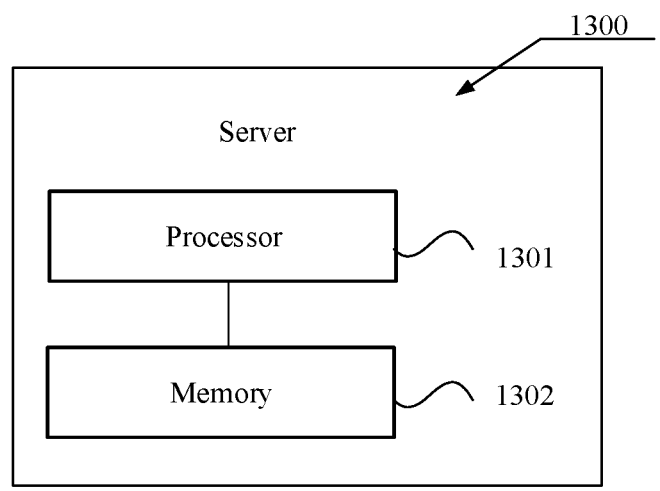
FIG. 13 is a schematic structural diagram of a server according to an embodiment of this application.

FIG. 13 is a schematic structural diagram of a server according to an embodiment of this application. The server 1300 may vary greatly because a configuration or performance varies, and may include one or more central processing units (CPU) 1301 and one or more memories 1302. The one or more memories 1302 store at least one piece of program code, and the at least one piece of program code is loaded and executed by the one or more processors 1301 to implement the methods provided in the foregoing various method embodiments. Certainly, the server 1300 may also have a wired or wireless network interface, a keyboard, an input/output interface and other components to facilitate input/output. The server 1300 may also include other components for implementing device functions. Details are not described herein.

In an exemplary embodiment, a computer-readable storage medium, such as a memory including program code, is further provided, and the program code may be executed by a processor to complete the display method for item information in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

A person of ordinary skill in the art may understand that all or some of the steps of the foregoing embodiments may be implemented by hardware, or may be implemented by a program code relevant hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A method for displaying item information performed by a computer device, the method comprising:

receiving, from a server, a live stream, the live stream comprising a live stream host performing in a live stream environment and at least one item located in the live stream environment, and the at least one item comprising a target item;

displaying the live stream on a display of the computing device;

in response to receiving, via the display, an item recognition operation:

recording a timestamp of the live stream corresponding to the item recognition operation;

transmitting the timestamp to the server, and causing the server to:

obtain a live stream image from cached live stream video data of the live stream according to the timestamp; and perform image recognition on the live stream image, including:

determining one or more scene keywords corresponding to the live stream environment before the live stream host performs in the live stream environment;

determining, from the live stream image, a plurality of keywords describing objects in the live stream image; and deleting the one or more scene keywords from the plurality of keywords to obtain one or more item keywords describing the at least one item located in the stream environment;

displaying, on the display with the live stream, one or more item tags corresponding to the at least one item; and in response to receiving a first selection operation on an item tag of the target item, displaying an item link region on the display of the computer device, the item link region comprising a product link corresponding to the target item.

2. The method according to claim 1, wherein the in response to receiving a first selection operation on an item tag of the target item, displaying an item link region on the display of the computer device comprises:

in response to receiving the first selection operation on the item tag of the target item, obtaining at least one product link corresponding to the target item; and displaying at least one product option in the item link region, wherein each product option respectively corresponds to a product link.

3. The method according to claim 2, wherein the at least one product option comprises a target product option; and after the displaying the at least one product option in the item link region, the method further comprises:

receiving a second selection operation on the target product option; and displaying, based on the second selection operation, resource exchange information, wherein the resource exchange information is configured to indicate information when resources are exchanged for a product corresponding to the target product option.

4. The method according to claim 2, wherein the in response to receiving the first selection operation on the item tag of the target item, obtaining at least one product link corresponding to the target item comprises:

in response to receiving the first selection operation on the item tag of the target item, transmitting a target item keyword corresponding to the target item to a server; and receiving the product link fed back by the server based on the target item keyword.

5. The method according to claim 2, wherein the displaying the at least one product option in the item link region further comprises:
   obtaining resource exchange data corresponding to the at least one product link, wherein the resource exchange data is configured to indicate a historical transaction situation corresponding to the at least one product option; and
   sequentially displaying, based on the resource exchange data, the at least one product option in the item link region.

6. The method according to claim 1, wherein the method further comprises:
   receiving, from the server, tag display information based on the item recognition request, wherein the tag display information is configured to indicate a display manner of the one or more item tags corresponding to the at least one item in the live stream; and
   displaying, on the display with the live stream, based on the tag display information, the one or more item tags.

7. The method according to claim 1, wherein the in response to receiving a first selection operation on an item tag of the target item, displaying an item link region on the display of the computer device comprises:
   in response to receiving the first selection operation on the item tag of the target item, performing face recognition on the live stream image to obtain a face region in the live stream image; and
   superimposing and displaying the item link region in a region outside the face region in the live stream image.

8. The method according to claim 1, wherein the in response to receiving a first selection operation on an item tag of the target item, displaying an item link region on the display of the computer device comprises:
   in response to receiving the first selection operation on the item tag of the target item, performing face recognition on the live stream image;
   in response to the live stream image comprising a face region, superimposing and displaying the item link region on the live stream image with a first transparency; and
   in response to the live stream image not comprising the face region, superimposing and displaying the item link region on the live stream image with a second transparency, wherein the first transparency is higher than the second transparency.

9. A computer device, comprising one or more processors and one or more memories, the one or more memories storing at least one piece of program code, the program code being loaded and executed by the one or more processors and cause the computer device to implement a method for displaying item information including:
   receiving, from a server, a live stream, the live stream comprising a live stream host performing in a live stream environment and at least one item located in the live stream environment, and the at least one item comprising a target item;
   displaying the live stream on a display of the computing device;
   in response to receiving, via the display, an item recognition operation:
      recording a timestamp of the live stream corresponding to the item recognition operation;
      transmitting the timestamp to the server, and causing the server to:
         obtain a live stream image from cached live stream video data of the live stream according to the timestamp; and
         perform image recognition on the live stream image, including:
            determining one or more scene keywords corresponding to the live stream environment before the live stream host performs in the live stream environment;
            determining, from the live stream image, a plurality of keywords describing objects in the live stream image; and
            deleting the one or more scene keywords from the plurality of keywords to obtain one or more item keywords describing the at least one item located in the stream environment;
   displaying, on the display with the live stream, one or more item tags corresponding to the at least one item; and
   in response to receiving a first selection operation on an item tag of the target item, displaying an item link region on the display of the computer device, the item link region comprising a product link corresponding to the target item.

10. The computer device according to claim 9, wherein the in response to receiving a first selection operation on an item tag of the target item, displaying an item link region on the display of the computer device comprises:
   in response to receiving the first selection operation on the item tag of the target item, obtaining at least one product link corresponding to the target item; and
   displaying at least one product option in the item link region, wherein each product option respectively corresponds to a product link.

11. The computer device according to claim 10, wherein the at least one product option comprises a target product option; and
   after the displaying the at least one product option in the item link region, the method further comprises:
      receiving a second selection operation on the target product option; and
      displaying, based on the second selection operation, resource exchange information, wherein the resource exchange information is configured to indicate information when resources are exchanged for a product corresponding to the target product option.

12. The computer device according to claim 10, wherein the in response to receiving the first selection operation on the item tag of the target item, obtaining at least one product link corresponding to the target item comprises:
   in response to receiving the first selection operation on the item tag of the target item, transmitting a target item keyword corresponding to the target item to a server; and
   receiving the product link fed back by the server based on the target item keyword.

13. The computer device according to claim 10, wherein the displaying the at least one product option in the item link region further comprises:
   obtaining resource exchange data corresponding to the at least one product link, wherein the resource exchange data is configured to indicate a historical transaction situation corresponding to the at least one product option; and
   sequentially displaying, based on the resource exchange data, the at least one product option in the item link region.

14. The computer device according to claim 9, wherein the method further comprises:

receiving, from the server, tag display information based on the item recognition request, wherein the tag display information is configured to indicate a display manner of the one or more item tags corresponding to the at least one item in the live stream; and displaying, on the display with the live stream, based on the tag display information, the one or more item tags.

15. The computer device according to claim 9, wherein the in response to receiving a first selection operation on an item tag of the target item, displaying an item link region on the display of the computer device comprises:

in response to receiving the first selection operation on the item tag of the target item, performing face recognition on the live stream image to obtain a face region in the live stream image; and superimposing and displaying the item link region in a region outside the face region in the live stream image.

16. The computer device according to claim 9, wherein the in response to receiving a first selection operation on an item tag of the target item, displaying an item link region on the display of the computer device comprises:

in response to receiving the first selection operation on the item tag of the target item, performing face recognition on the live stream image;

in response to the live stream image comprising a face region, superimposing and displaying the item link region on the live stream image with a first transparency; and in response to the live stream image not comprising the face region, superimposing and displaying the item link region on the live stream image with a second transparency, wherein the first transparency is higher than the second transparency.

17. A non-transitory computer-readable storage medium, storing at least one piece of program code, the program code being loaded and executed by one or more processors of a computer device and causing the computer device to implement a method for displaying item information including:

receiving, from a server, a live stream, the live stream comprising a live stream host performing in a live stream environment and at least one item located in the live stream environment, and the at least one item comprising a target item;

displaying the live stream on a display of the computing device;

in response to receiving, via the display, an item recognition operation:

recording a timestamp of the live stream corresponding to the item recognition operation;

transmitting the timestamp to the server, and causing the server to:

obtain a live stream image from cached live stream video data of the live stream according to the timestamp; and perform image recognition on the live stream image, including:

determining one or more scene keywords corresponding to the live stream environment before the live stream host performs in the live stream environment;

determining, from the live stream image, a plurality of keywords describing objects in the live stream image; and deleting the one or more scene keywords from the plurality of keywords to obtain one or more item keywords describing the at least one item located in the stream environment;

displaying, on the display with the live stream, one or more item tags corresponding to the at least one item; and in response to receiving a first selection operation on an item tag of the target item, displaying an item link region on the display of the computer device, the item link region comprising a product link corresponding to the target item.

18. The non-transitory computer-readable storage medium according to claim 17, wherein the in response to receiving a first selection operation on an item tag of the target item, displaying an item link region on the display of the computer device comprises:

in response to receiving the first selection operation on the item tag of the target item, obtaining at least one product link corresponding to the target item; and displaying at least one product option in the item link region, wherein each product option respectively corresponds to a product link.

* * * * *